Patented Dec. 2, 1924.

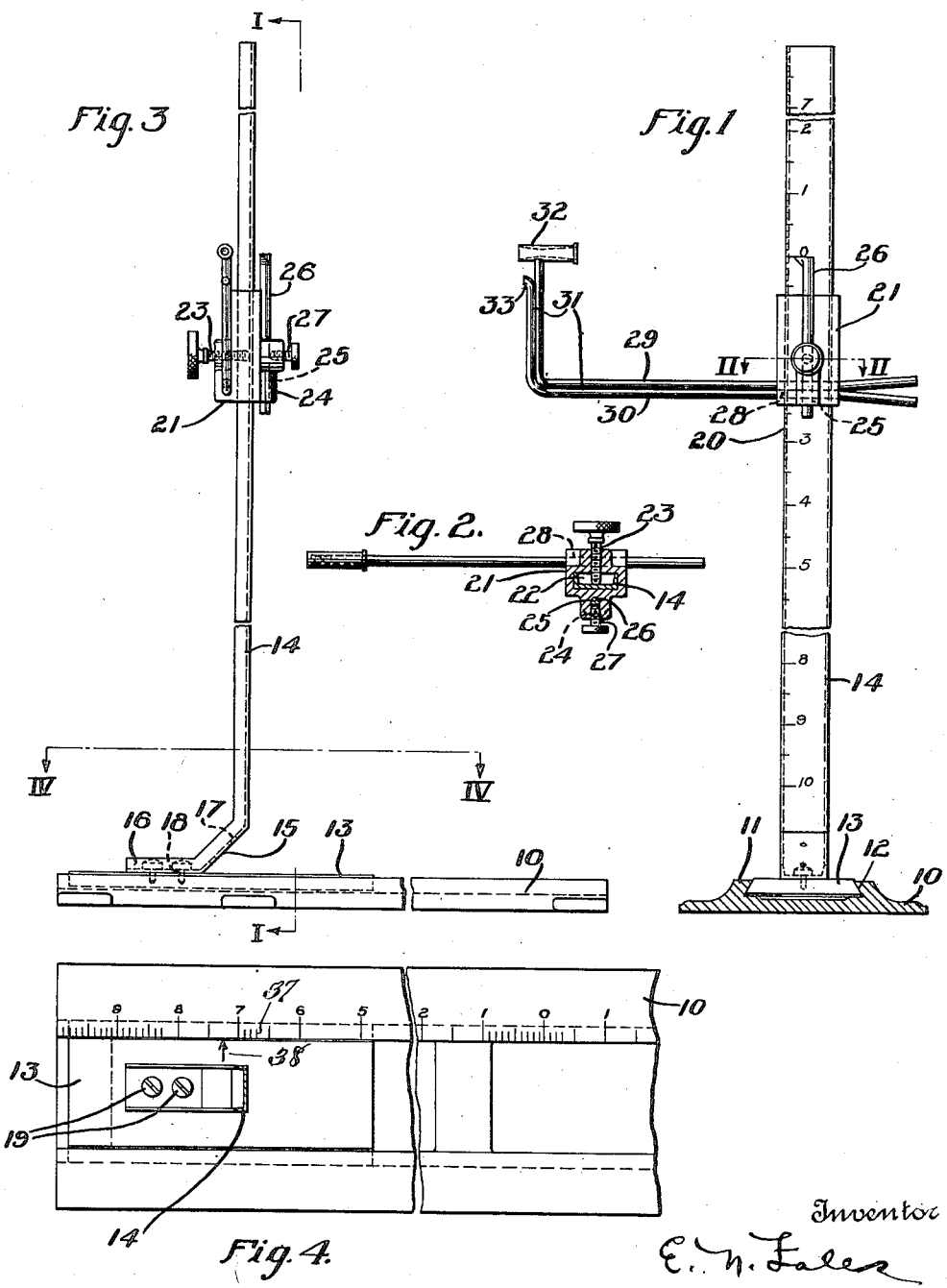

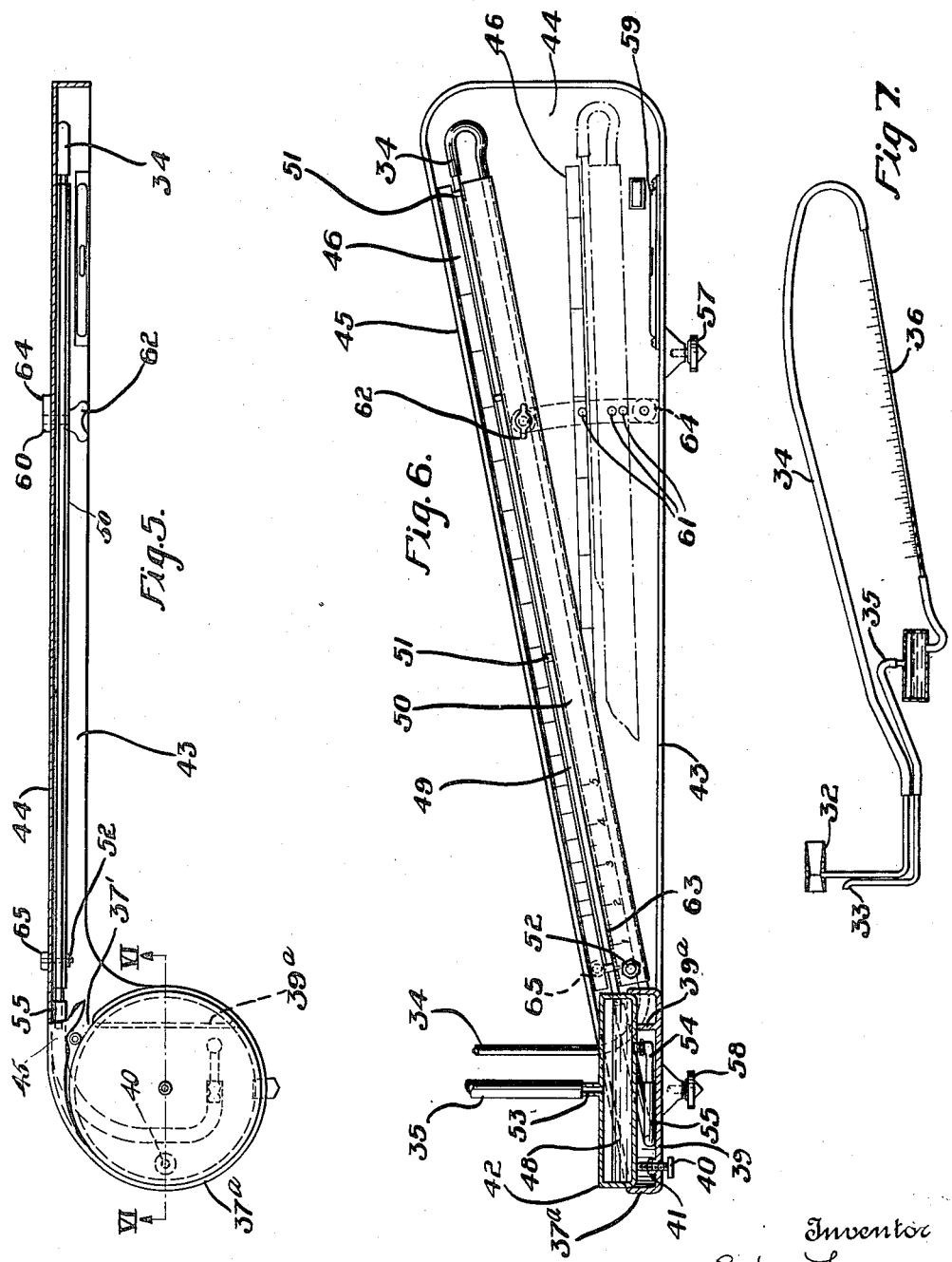

1,517,350

UNITED STATES PATENT OFFICE.

ELISHA N. FALES, OF LAKE FOREST, ILLINOIS.

INSTRUMENT FOR MEASURING AIR VELOCITY.

Application filed December 15, 1921. Serial No. 522,531.

*To all whom it may concern:*

Be it known that I, ELISHA N. FALES, citizen of the United States, residing at Lake Forest, in the county of Lake and State of Illinois, have invented certain new and useful Improvements in Instruments for Measuring Air Velocity, of which the following is a specification.

This invention relates to an instrument for measuring the velocity of air flowing in an open or confined space and is particularly applicable to the measurement of low velocity air.

According to my invention an air speed head consisting preferably of a Venturi and a Pitot tube is arranged for vertical adjustment upon a pedestal and the latter is slidably mounted for horizontal adjustment along a suitable base. A manometer connected to the air speed head indicates the air velocity at the point in the air stream at which the adjacent Venturi and Pitot tubes are located. By placing the air speed head at various points in the area of air flow and thus forming a traverse of that area, and noting the various readings for air velocity, the average air speed and total pressure on a given surface may be obtained.

My invention also aims to provide means for readily indicating low velocities including an inclined tube the angularity of which may be varied in accordance with the intensity of pressure produced in said Venturi and Pitot tubes.

Other objects of the invention consisting in novel features of construction and arrangements of parts will become apparent as the description proceeds. The invention is described in the following specification in connection with the accompanying drawings, in which—

Fig. 1 is a sectional view through the base showing the pedestal in front elevation, the section being taken on the line 1—1 of Fig. 3;

Fig. 2 is a sectional view on the line 2—2 of Fig. 1;

Fig. 3 is a side elevation of the pedestal, showing the base and the slide associated therewith;

Fig. 4 is a plan view of the assembled pedestal and base, showing the pedestal in section on the line 4—4 of Fig. 3;

Fig. 5 is a plan view of the manometer associated with the air speed head, showing the side plate in section;

Fig. 6 is a sectional view on the line 6—6 of Fig. 5; and

Fig. 7 is a diagrammatic illustration of the connections between the air speed head and the inclined manometer tube.

Like numerals represent corresponding parts throughout the several views of the drawings.

The numeral 10 designates a base having a recess formed therein. The side walls 11 of the recess are undercut so as to provide V-shaped guideways 12 in which the foot 13 of a pedestal 14 is slidably mounted. The pedestal is formed near the bottom with a slanting surface 15 which is also bent to provide the terminal horizontal surface 16. The surfaces 15 and 16 are pierced by apertures 17 and 18 through which screws 19 are adapted to pass for the purpose of securing either horizontal surface 16 or inclined surface 15 to the foot 13. When the horizontal surface 16 is attached to the foot 13 the pedestal is vertical while when the angularly disposed surface 15 is fastened to the foot the pedestal extends at an angle of 45° from the foot 13 and base 10. The pedestal or standard 14 is channel shaped and the face of the channel is graduated as indicated at 20.

A slide 21 consisting of a substantially rectangular block of metal has a rectangular opening 22 formed therethrough for receiving the pedestal 14. A thumb screw 23 passing transversely through one side of the slide is adapted to clamp the latter in adjusted position. A lug 24 projecting from the side of the slide opposite from the screw 23 is drilled to provide a hole 25 extending parallel to the opening 22. A longitudinally adjustable pointer 26 is mounted in this hole and a thumb screw 27 extending transversely through the lug is adapted to clamp the pointer in adjusted position. The slide 21 is also formed with a recess 28 located in the rear of opening 22 and extending at right angles thereto. A tubular unit, comprising two tubes 29, 30 firmly soldered together at 31, tightly fits into this recess. The tubes 29 and 30 lead respectively to the Venturi tube 32 and the Pitot tube 33 which are arranged in close proximity and constitute the air-speed head. The ends of the tubes 29, 30 are bent outwardly immediately beyond the slide 21 in order to bind the tubes more tightly in the recess 28 and to afford space for the connection of separate flexible tubes 34 and 35 thereto. These flexible tubes lead to a manometer 36 as diagrammatically illustrated in Fig. 7. The base 10 is graduated adjacent the guideways 12 as indicated at 37 and an index mark 38 on the foot of pedestal 14 is adapted to cooperate with said graduations for the purpose of locating the position of the air speed head in relation to a given surface. It will be remembered that the slide 21 carrying the air speed head is vertically adjustable on the pedestal so that by means of the scales 20 and 37 the vertical and horizontal position of said head in relation to a given surface can be readily determined. Thus the average air speed and total pressure in air velocity on a given surface may be obtained. The adjustable pointer 26 permits the selection of any starting point as the zero position of the slide.

The manometer designated generically by the numeral 36 is provided with a main frame having a circular portion 39 at one end formed with a partition wall 39$^a$. The circular portion 39 is provided with an upturned annular flange 37$^a$ which is interrupted by a gap 37' for a purpose which will hereinafter appear. An adjusting screw 40 is threaded through an aperture formed in a boss 41 of the base of circular portion 39. This adjusting screw is spaced from partition 39$^a$ and is located about midway of the length thereof in order that the partition and adjusting screw may form a substantial support for a circular reservoir 42 which is received within the annular flange 37$^a$ of the main frame. A narrow base plate 43 extends from the circular portion 38 in such relation that an upstanding side plate 44, arranged at the rear side of plate 43, is substantially tangent thereto. The upper flange 45 of this side plate is preferably inclined upwardly from the annular flange 37$^a$. A plurality of series of graduations 46 are marked on the vertical side plate 44 at different inclinations in order to indicate the level of the liquid 48 in a glass tube 49 when the latter is adjusted to a slope corresponding to the inclination of one series of graduations.

The glass tube 49 is mounted on a rectangular block 50 by means of clips 51. This block is pivotally mounted at one end on the side plate 44 by means of a pivot bolt 52 passing transversely through the plate and block. The block 50 is formed with an interior longitudinal passage through which the flexible tube 34 is adapted to pass in order to connect to the upper end of glass tube 49. In this way a large part of the flexible tubing is completely enclosed and protected from injury. The reservoir 42 is closed except for a nipple 53 which communicates with one end of the flexible connection 35 and a pipe connection 54 in the bottom of the reservoir which is connected by flexible tubing 55, extending through the gap 37', to the lower end of the glass tube 49. The main frame 38, 43 is provided with adjustable supporting legs 57 and 58, respectively, so that the instrument may be brought to a true level, as indicated by the level 59 secured to the base plate 43.

An arc-shaped strip 60, preferably of metal is secured to the base 43 and side plate 44, and this metal strip, and side plate, have aligning apertures 61 formed therein at points corresponding to the slope of the scales 46. The block 50 is also formed with a transverse aperture adapted to be brought into alignment with any one of said apertures 61 by pivotal movement of the block about the bolt 52. A screw 62 is inserted in the registering apertures in order to hold the block in adjusted position. A scale 46 properly graduated corresponds to each of the inclinations of the glass tube 49 afforded by the apertures 61, therefore no set of graduations can be used except the proper set. These scales read directly in terms of velocity of the air but in case it is desired to read in inches, graduations 63 are placed on the face of the block 50. Apertured bosses 64, 65 are formed on the side wall 44 so that the manometer may be fastened to a vertical wall if desired, it being noted that there are no large protuberances extending rearwardly to interfere with this vertical mounting.

In operation the air speed head is positioned horizontally and vertically at various points in the area of air flow and the pressure effect is noted in terms of velocity by the level of the liquid in the glass tube 49. This glass tube is given an inclination depending upon the intensity of the pressure. A slight inclination affords a greater movement of the liquid for small changes of pressure and therefore small changes are more readily indicated on the scales having slight inclinations.

It is evident that those skilled in the art may vary the details of construction as well as the arrangement of parts without departing from the spirit of the invention, and therefore I do not wish to be limited to the above disclosure except as may be required by the claims.

I claim:

1. In combination, a base, a pedestal horizontally slidable relatively to the base, said pedestal having graduations thereon, a slide adjustably mounted on said pedestal, an air speed head carried by said slide, a pointer adjustably mounted on said slide whereby the zero position of said slide may be varied, a manometer, and means connecting said air speed head to the manometer.

2. In combination, a base, a pedestal bent at one end to form an angularly disposed portion and a horizontal portion, said pedestal including a foot slidable relatively to said base, means for securing either the angularly disposed or the horizontal portion of the pedestal to the foot, a slide mounted for vertical adjustment on said pedestal, an air speed head carried by said slide, a manometer, and means connecting said air speed head to the manometer.

In testimony whereof I have affixed my signature.

ELISHA N. FALES.